(12) United States Patent
Hofmann

(10) Patent No.: US 9,910,267 B2
(45) Date of Patent: Mar. 6, 2018

(54) MICROACTUATOR ARRANGEMENT FOR DEFLECTING ELECTROMAGNETIC RADIATION

(71) Applicant: Fraunhofer-Gesellschaft zur Förderung der angewandten Forschung e.V., München (DE)

(72) Inventor: Ulrich Hofmann, Itzehoe (GB)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 243 days.

(21) Appl. No.: 14/206,381

(22) Filed: Mar. 12, 2014

(65) Prior Publication Data
US 2014/0333980 A1  Nov. 13, 2014

(30) Foreign Application Priority Data
Apr. 11, 2013  (DE) .................. 10 2013 206 396

(51) Int. Cl.
*G02B 26/08* (2006.01)
*G02B 26/10* (2006.01)

(52) U.S. Cl.
CPC ....... *G02B 26/0833* (2013.01); *G02B 26/085* (2013.01); *G02B 26/0841* (2013.01); *G02B 26/0858* (2013.01); *G02B 26/101* (2013.01)

(58) Field of Classification Search
CPC .... G02B 26/08; G02B 26/10; G02B 26/0858; G02B 26/0841; G02B 26/085; G02B 26/0833; G02B 26/101; G02B 26/106; G02B 26/105; G02B 7/18; B60R 1/06; B60R 1/072; H04N 9/3129

USPC ......... 359/221.2, 201.2, 211.5, 212.1, 200.6, 359/223.1, 224.1, 214.1, 198.1, 199.2, 359/199.4, 298, 872, 873, 874

See application file for complete search history.

(56) References Cited

U.S. PATENT DOCUMENTS 5,543,956 A * 8/1996 Nakagawa ........... G02B 26/085
                                                   310/36
6,975,442 B2   12/2005 Gessner et al.
(Continued)

FOREIGN PATENT DOCUMENTS

CN   1800906 A    7/2006
CN   101135775 A  3/2008

OTHER PUBLICATIONS

Yalcinkaya, Arda D., et al., "Two-axis Electromagnetic Microscanner for High Reslolution Displays", vol. 15, Issue 4, IEEE Journal of Microelectromechanical Systems, (Aug. 2006), 786-794.

*Primary Examiner* — Jie Lei
(74) *Attorney, Agent, or Firm* — Schwegman Lundberg & Woessner, P.A.

(57) ABSTRACT

A microactuator arrangement for the deflection of electromagnetic radiation, with a mirror plate which is suspended on a drive frame in a movable manner about a first rotation axis via spring elements, wherein the drive frame is suspended on a chip frame in a movable manner about a second rotation axis via spring elements, wherein the drive frame is not closed and comprises a recess adjacent to the mirror plate and wherein the chip frame at least in the region of the recess of the drive frame is not closed, in a manner such that a deflected and/or incident beam is not inhibited by the drive frame and the chip frame.

14 Claims, 5 Drawing Sheets

(56) References Cited

U.S. PATENT DOCUMENTS

Figure 1:
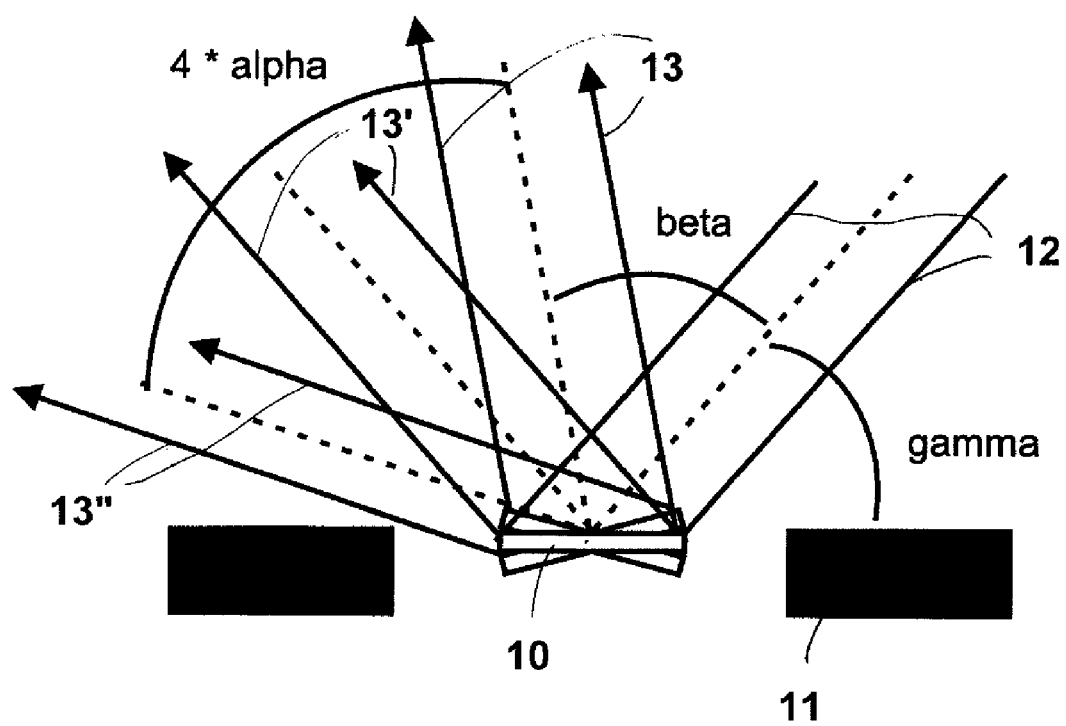

| | | | |
|---|---|---|---|
| 7,123,400 B2 * | 10/2006 | Murakami | G02B 26/105 359/290 |
| 2006/0125346 A1 | 6/2006 | Yoda | |
| 2008/0055688 A1 | 3/2008 | Miyagawa et al. | |
| 2009/0109512 A1 | 4/2009 | Park | |

* cited by examiner

MICROACTUATOR ARRANGEMENT FOR DEFLECTING ELECTROMAGNETIC RADIATION

PRIORITY CLAIM TO RELATED APPLICATIONS

This application claims the benefit of priority of German Patent Application Serial No. 10 2013 206 396.2, entitled "MIKROAKTUATORANORDNUNG ZUR ABLENKUNG ELEKTROMAGNETISCHER STRAHLUNG," filed on Apr. 11, 2013, which is incorporated by reference herein in its entirety.

The invention relates to a microactuator arrangement for deflecting electromagnetic radiation, according to the preamble of the main claim.

Resonantly operated micromirror actuators (MEMS scanners) are generally known from the state of the art. They are often applied for deflecting laser light or other electromagnetic radiation. Micromirror actuators are to be understood as micro-technologically manufactured mirrors which are movably suspended on torsion springs and/or bending springs and which are set into movement by electrostatic, electromagnetic, thermal or piezoelectric drives. Resonant operation which is achieved by way of matching the activation frequency to the natural resonance of the actuator permits the attainment of very large oscillation amplitudes of the mirror of sometimes more than +/−30 degrees.

In most cases, MEMS scanners are applied such that an incident beam always encloses an angle >0 with respect to the deflected beam. This is achieved by way of angling the incident beam with respect to the surface normals of the mirror. The spatial angles of the incident beam and the departing emerging beam are thus preferably completely different from one another with such a use, irrespectively of the tilting of the MEMS mirror with respect to its idle position. An overlapping of the spatial angle regions would otherwise occur, and this as a rule would reduce the useable region of the beam deflection in an unfavourable manner. From the known law "incident angle equals emerging angle", it results that the optical total scan angle region is always double the mechanical total tilt angle region. Expressed in other words, the optically scanned angle region is four times larger than the angle amplitude of the mirror oscillation. This relation applies to the most frequently applied case of the incident beam being orientated perpendicularly to the rotation axis of the movably suspended mirror. Factors which are smaller than four result in all other cases.

It is directly evident that the larger the resonance amplitude of the MEMS scanner, the greater must the necessary angling of the incident beam turn out to be, in order for the angle range of the scanned and of the incident beam not to overlap. It is also directly evident that there must be a limited, maximally useable MEMS scanner amplitude. A resonance scanner, whose mechanical mirror deflection is +/−45 degrees and whose optical deflection must accordingly be 180 degrees would no longer permit non-overlapping spatial angles for the incident beam. If the mechanical oscillation angle amplitude of the mirror is defined as alpha and the minimal enclosed angle between the incident beam and the scanned emerging beam as beta, then the following relation results:

$$4*alpha+beta<180 \quad (1)$$

From this, one can recognise that there are also cases, in which a limitation of the useable scan angle region occurs already at smaller oscillation amplitudes, specifically when the application right from the start demands a large deflection of the incident beam already with an idle or resting mirror, which is tantamount to a large angle beta. If for example the incident beam is to be separated from the region of the scanned emerging beam by an angle beta of 100 degrees, then the maximally useable oscillation amplitude alpha cannot be greater than 20 degrees.

In most real cases, an arrangement is not only limited by the relation (1), but additionally by the demand of not hitting the mirror in a too shallow manner with the incident beam, since the effectively active mirror surface would otherwise be insufficiently small. The relation (1) would basically also permit arrangements, with which the incident beam is only slightly angled with respect to the mirror surface (wherein the surface normal of the mirror would almost enclose an angle of 90 degrees with the incident beam). In this case, with which the incident beam would run almost parallel to the mirror surface, with a predefined mirror plate size, only a small share of the incident beam would hit the mirror surface. This as a rule is not desirable. For this reason, it makes sense to select a deflection angle gamma between the mirror surface in the idle position or chip surface and the incident beam, which in most cases is significantly greater than 20 degrees. Since the exit beam also encloses an angle gamma with the MEMS-scanner chip surface given an idle position of the mirror, half the optical scan angle (2*alpha) cannot be greater than gamma. Therefore, it applies that:

$$2*alpha<gamma \quad (2)$$

and $$4*alpha+beta+gamma<180 \quad (3)$$

tantamount to $$6*alpha+beta>180 \quad (4)$$

The largest possible scan angle would thus be achieved when alpha is slightly smaller than 30°, beta slightly greater that 0° and gamma almost 60°.

In many cases however, it is necessary for the angle region (4*alpha) of the deflected beam to be spatially separated far from the spatial angle of the beam which is incident onto the MEMS scanner, which is equates to a large angle beta. If, despite this, the scanner should simultaneously have a large deflection region (scan angle), then this can lead to the deflected beam no longer being able to leave the chip in an undisturbed manner, since the stationary frame structures of the MEMS scanner chip lie in the beam path and interrupt this. If for example, a laser beam scanned by the mirror is to enclose an angle of at least 90 degrees to an incident beam incident below 15 degrees to the chip surface (beta=90 degrees, gamma=15 degrees) then a theoretical maximal angle alpha of slightly less than 15 degrees results, at which the deflected beam only just, would still not be inhibited by the frame of the chip. Hereby, it is assumed that the chip frame is directly adjacent to the movably suspended mirror plate. The angle region, within which an uninhibited beam path is possible, however will actually still be significantly lower than this theoretical value, since the angle alpha of 15 degrees only applies to an infinitely small beam diameter. The greater the beam diameter and as a result of this, also the mirror plate diameter, the lower becomes the angle region or range, at which an unhindered passing of the chip geometry is possible.

A large scan angle is necessary in numerous applications, in order to optically scan an angle region with a large optical resolution. The number of measurement points which can be differentiated as spatially separate from one another amongst other things scales with the optical total scan angle.

One usually envisages resonant operation of the electromagnetically, electrostatically or piezoelectrically driven MEMS scanner, in order to achieve large scan angles of an MEMS scanner. A significant damping accompanies the drive structures such as comb electrodes (electrostatic drive), piezo-bimorphs (piezoelectric drive) or planar coil areals (electromagnetic drive), since with electrostatic drives, the air must pass the narrow gaps between the finger-like electrodes, or since the piezoelectric layer of the bimorph has a high internal damping on bending, or however since the planar coil structure of the MEMS actuator is very extensive and must move a large air mass.

In order, despite these constraints, to permit large amplitudes of the mirror actuator, i.e. larger angles than those which are set by the inequality (3), a spatially geometric separation of the drive oscillator and mirror oscillator which are coupled to one another via a spring element makes sense. Such double oscillators have already been published in different versions.

U.S. Pat. No. 6,975,442 B2 describes a coupled actuator whose passive mirror plate is placed in a surrounding drive frame (parallel-plate-capacitor drive) in a movable manner via torsion springs. The drive frame is likewise suspended in a chip frame via torsion springs.

Yalcinkaya et al. in "Two-Axis Electromagnetic Microscanner for High Resolution Displays" Journal of Microelectromechanical Systems, Vol. 15, No. 4, August 2006, p. 786-794 describes a similar coupled mirror actuator based on an electromagnetic drive principle.

Common to these actuator concepts is the fact that they use a double resonator idea by way of an outer resonator setting an inner resonator into oscillation. The damping of the inner mirror oscillator can be minimised due to the fact that the inner resonator does not have its own drive structures. The double resonator has two resonant frequencies. Usually, the resonators are designed such that at a first resonance, both resonators oscillate in an equal-phased manner and at a higher, second resonant frequency both oscillate counter-phase to one another (see frequency response in FIG. 3). A desired amplitude amplification of the inner oscillator is obtained with a suitable design of spring strengths and moments of inertia, i.e. the mirror has a much greater oscillation angle amplitude than the drive frame. The amplification factor typically lies between 3 and 20. If the moment of inertia of the mirror is indicated by $J_1$, the moment of inertia of the outer drive frame by $J_2$, the damping constants of the mirror or of the surrounding drive frame by $c_1$ and $c_2$, the spring constants of the mirror suspension or of the frame suspension of the drive frame by $k_1$ and $k_2$, as well as the corresponding oscillation angles of the mirror and drive frame by theta 1 and theta 2, then the following movement equation results for the behaviour of the mirror:

$$J_1\ddot{\theta}_1 + c_1\dot{\theta}_1 + k_1(\theta_1 - \theta_2) = 0 \quad (5)$$

and for the outer drive frame onto which a torque $T_{Aktuator}$ acts:

$$J_2\ddot{\theta}_2 + c_2\dot{\theta}_2 + (k_1 + k_2)\theta_2 - k_1\theta_1 = T_{Aktuator} \quad (6)$$

A particular advantage of this arrangement, particularly with the application of electrostatic comb drives is the fact that the movable electrode fingers chiefly or completely operate in the overlapping region due to the low amplitude of the drive frame. The movable electrode fingers with respect to the oscillation period only leave the opposite activation electrode fingers for a relatively short time and under certain circumstances even not at all. This permits an efficient operation. This also similarly applies to electromagnetic drives, wherein it is favourable if the gap between the movable drive frame with planar coil and a permanent magnet possibly arranged therebelow remains as small as possible and the field strength is thus high.

It is the object of the invention, to provide a microactuator arrangement according to the preamble of the independent claim, which on account of its geometry and conception permits large deflection angles, i.e. maximal scan angles, wherein the maximal angle should be fully utilised, and in particular the deflected beam path should not be disturbed or as little as possible, and wherein a space-saving construction is ensured, in order to be able to accommodate an as large as possible number on a silicon wafer and to be able to manufacture them in an inexpensive manner. Thereby, the micromirror arrangement should fulfil the requirement of the inequality 4*alpha+beta+gamma>180.

According to the invention, this object is achieved by the characterising features of the main claim in combination with the features of the preamble.

Advantageous further developments and improvements are possible by way of the measures specified in the dependent claims.

According to the invention, the drive frame which via spring elements is suspended on a chip frame in a manner movable about a rotation axis, is not closed and comprises a recess adjacent to a mirror plate which via spring elements is suspended on the drive frame in a manner movable about a further rotation axis. Moreover, according to the invention, the chip frame is not closed, at least in the region of the recess of the drive frame, by which means a deflected and/or incident beam is not inhibited by the drive frame and the chip frame due to the design of the drive frame and the chip frame. In this manner, one can provide a microactuator arrangement, with which on the one hand very large deflection angles can be achieved and on the other hand, due to the inventive design of the drive frame and the chip frame, the maximal deflection angle can be completely utilised and a free beaming from the mirror plate is possible even at these maximally achieved deflection angles. Moreover, the microactuator arrangement can be designed in a compact manner, by which means the spatial requirement is kept low.

In an advantageous manner, the rotation axis of the mirror plate and the rotation axis of the drive frame are arranged parallel to one another, and preferably they correspond to one another. The achievement of a maximal deflection angle is ensured due to this measure.

The microactuator arrangement according to the invention comprises a drive, which drives the non-closed drive frame for rotation or for pivoting about its rotation axis, wherein an electrostatic, piezoelectric or electromagnetic drive can be used depending on the desired design.

In a particularly preferred embodiment, the drive is designed in an electrostatic manner and comprises comb electrodes which at the closed continuous side of the drive frame are arranged oppositely to the recess and on the continuous side of the chip frame which lies opposite to this recess, wherein the finger-like electrodes of the drive frame and the finger-like electrodes of the chip frame mesh, which is to say engage into one another. The microactuator arrangement can be designed in a space-saving manner due to this measure.

With a further advantageous embodiment example, the chip frame is designed in a U-shaped manner in a plan view, wherein the open side of the U lies at the side of the recess of the drive frame. The electrodes of the drive are likewise arranged on the side opposite to the recess with such an arrangement. Such an arrangement with a U-shaped chip frame permits an advantageous space-saving and compact construction manner and thus an actuator which can be inexpensively manufactured.

It is advantageous if a lateral distance is arranged on the side lying opposite the recess, between the mirror plate and the drive frame, said distance being greater than the intermediate space between the mirror plate and the drive frame, which is inherent of the design. Even greatly angled incident beams, with which a vignetting of the mirror aperture due to the drive frame is avoided, can be used by way of such a measure.

It is particularly advantageous if the drive frame has an essentially rectangular basic shape, and the chip frame surrounds the rectangular drive frame with the exception of the recess, or in a U-shaped manner. Such an embodiment has a clear and simple construction.

Preferably, with a beam incident from the side lying opposite the recess, the lateral distance is accordingly selected x>h/tan(gamma)−r, wherein x is the lateral distance, r the radius of the mirror plate, h the deflection of the drive frame at the location of the distance x+r and gamma the deflection angle between the mirror surface in the idle position and the incident or emerging beam. With a reverse case, with which the incident beam firstly passes the recess in the chip frame and in the drive frame before it hits the mirror plate, the lateral distance x is in accordance with the inequality x>h/tan(gamma−2alpha)−r, wherein alpha is the singled-sided maximal mechanical adjustment angle of the mirror relative to the idle position and thus the mechanical oscillation amplitude.

According to the invention, a sensor arrangement for the detection of the position and phase position of the drive frame is arranged on the drive frame or on the chip frame. Thereby, comb-like sensors can be provided laterally next to the recess of the drive frame and the open region of the chip frame. With a U-shaped chip frame, comb-like sensors can be arranged on the limbs of the U and lying oppositely at a suitable location of the drive frame. A compact construction manner also arises by way of this.

It is particularly advantageous if the mirror plate is mirrored on both sides, since then an even greater spatial angle can be scanned. Thereby, during the during a first part of the microactuator oscillation period, the mirror deflects a beam which is incident from the side of the recess completely or essentially with the mirror upper side, and during the remaining share of the microactuator oscillation period it deflects this beam completely or essentially with the mirror lower side.

Embodiment examples of the invention are represented in the drawing and are explained in more detail in the subsequent description. There are shown in FIG. 1 a schematic representation of incident and reflected radiation with respect to a mirror plate, FIG. 2 a plan view of a first embodiment example of the microactuator plate according to the invention, FIG. 3 a representation of the amplitude frequency responses of a mirror plate and of a drive frame, with a microactuator arrangement according to the invention, FIG. 4 a plan view of a second embodiment example of the microactuator arrangement according to the invention, FIG. 5 a plan view of a third embodiment example of the microactuator arrangement according to the invention, FIG. 6 a schematic representation in section, of a microactuator arrangement according to the invention, with a beam incident onto the lower side of the mirror plate, and FIG. 7 a schematic representation, in section, of a microactuator arrangement according to the invention, with a beam incident onto the lower side of the mirror plate, and FIG. 8 a schematic representation, in section, of a microactuator arrangement according to the invention, with details of geometric sizes for determining the condition for the lateral distance between the drive frame and mirror plate.

A microactuator designed as a scanner, with a mirror plate 10 in different pivot positions, a chip frame 11 surrounding the mirror and an indicated incident beam bundle 12 and several deflection beam bundles 13, 13', 13" at different positions of the mirror plate are represented schematically in FIG. 1. The beaming-in angle or incident angle of the beam bundle 12, i.e. the angle between the mirror surface in the idle position and the incident beam or emerging beam is indicated at "gamma", the minimal enclosed angle between the incident beam 12 and the scanned exit beam is specified as "beta", wherein this angle realises the spatial separation of the incident beam and the scan angle region given an oscillating mirror, and the angle "alpha" is the mechanical oscillation amplitude of the mirror 10. As specified in the introductory part of the description, this figure serves for the explanation of the desired scan angle of an MEMS scanner.

Figure 2:
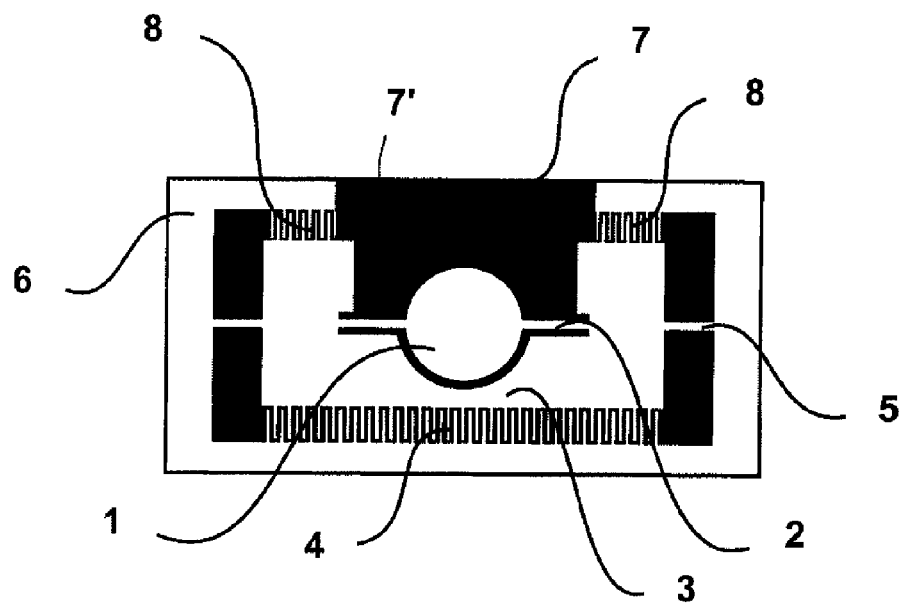

The microactuator arrangement according to the invention is represented in the form of a double resonator MEMS scanner in FIG. 2. The microactuator arrangement comprises a mirror plate 1 which is circular in the embodiment example and which is mounted in a drive frame 3 via torsion springs 2. The drive frame 3 in turn is attached on a chip frame 6 via torsion springs. The drive frame 3 and the chip frame 6 have an essentially rectangular basic shape, wherein the chip frame 6 surrounds the drive frame 3. However, a recess 7 is provided in the drive frame, and this recess at a long side of the rectangular basic shape extends from the peripheral edge up to the mirror plate 1. In a corresponding manner, the chip frame is interrupted in the region of the recess, i.e. the recess 7 seen from the mirror plate 1, continues outwards through an interrupted or non-closed region 7' in the chip frame 6.

The spring suspensions of the mirror plate 1 on the drive frame 3 via the torsion springs 2, and of the drive frame 3 on the chip frame 6 via the torsion springs 5 are arranged parallel to one another, and in the embodiment example they are arranged aligned in a line and therefore produce congruent rotation axes.

In the embodiment example, the associated drive is designed as an electrostatic comb drive with drive electrodes 4, whose movable fingers are arranged at the long side of the drive frame 3 which is opposite to the recess 7. The complementary static fingers of the electrodes 4, lying oppositely to this are attached on the stationary chip frame 6, wherein the movable fingers and the static or stationary fingers mesh into one another.

Sensor arrangements for detecting the position and the phase position of the drive frame 3 and which are designed as capacitively operating sensor combs 8 with meshing fingers are arranged on the chip frame 6 adjacently to the interrupted region 7' and on the drive frame 3, likewise adjacently to the recess 7.

On operation, the drive frame 3 is driven via the comb drive 4 into resonance, by which means the suspended mirror plate 1 forming an inner resonator is brought into oscillation. An amplitude amplification of the mirror plate 1 in comparison to the oscillation amplitude of the drive frame 3 occurs due to the design of the spring strengths of the torsion springs 2 and 5 and of the moment of inertia of the mirror plate 1 and of the drive frame 3.

Figure 3:
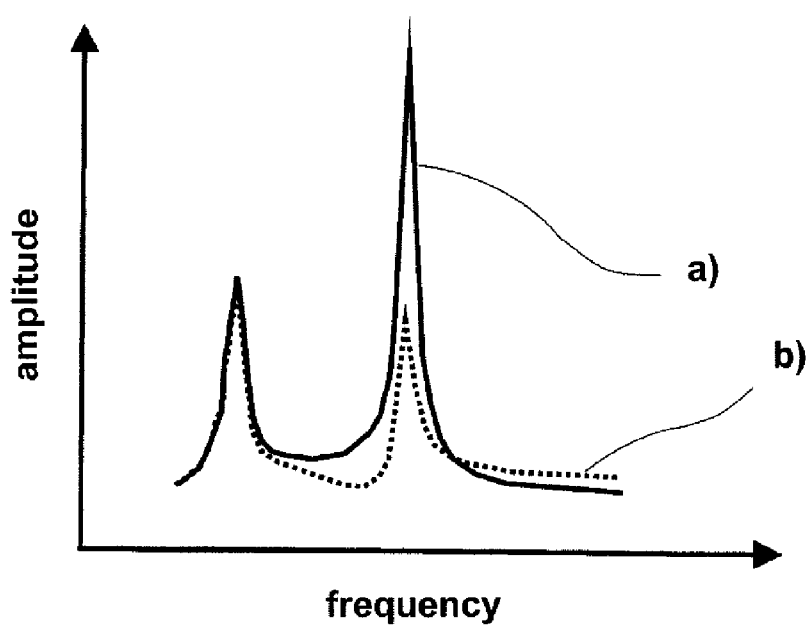

FIG. 3 with unbroken lines shows an amplitude frequency response of the mirror plate as an inner resonator (curve a), and the amplitude frequency response of the drive frame 3 (curve b) is shown with the dashed lines. As is to be recognised, the amplitude of the inner resonator, i.e. the mirror plate is greatly amplified at the second maximum. The oscillation amplitudes for the inner mirror plate 1 are up to +/−90°.

The beaming or radiation which is incident from the closed side of the chip frame 6 and of the drive frame 3 and is deflected by the mirror plate 1 at large oscillation angles, can be beamed outwards in an uninhibited manner and is not handicapped by the drive frame 3 or the stationary chip frame 6, due to asymmetrically provided recess 7 or the open region 7' in the drive frame 3 and in the chip frame 6. The position and the phase position of the oscillating drive frame 3 can be detected via the sensor combs 8, which at the same time indirectly permit the evaluation of the phase and position of the mirror plate, these being required for the control of the MEMS scanner.

Figure 4:
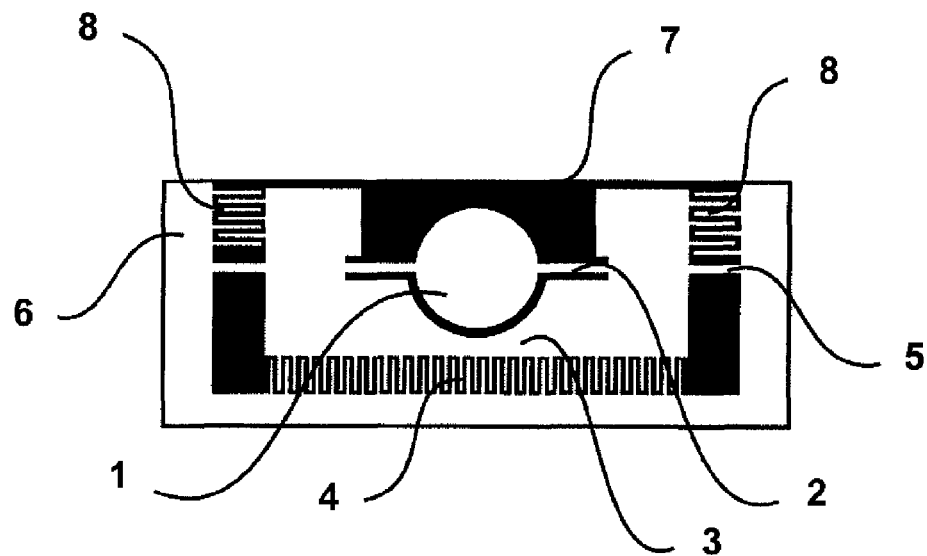

A further embodiment of the microactuator arrangement according to the invention is represented in FIG. 4. With this embodiment, the chip frame 6 is designed in a U-shaped manner and surrounds the drive frame 3 at three sides. Thereby, the electrodes of the sensor combs 8 are attached laterally on the short sides of the rectangular basic shape of the drive frame 3 and at the end regions of the limbs of the U-shaped frame 3. The construction manner can be reduced in size by way of this.

Figure 5:
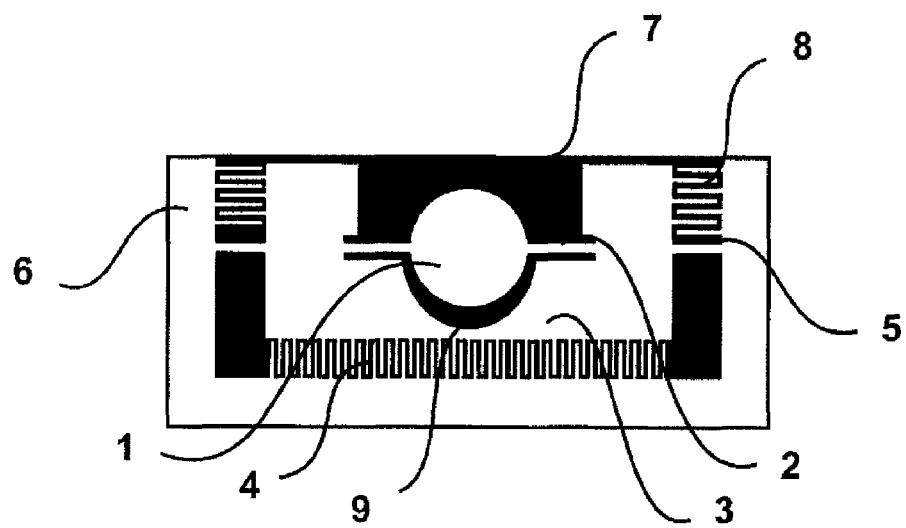

A further embodiment example is shown in FIG. 5, which differs from the embodiment example according to FIG. 4, in that a greater arc-shaped or lateral distancing or intermediate space 9 is provided between the mirror plate 1 and the drive frame 3 at the side of the mirror plate which is opposite to the recess, i.e. the drive frame is cut out further around the mirror plate, in order to provide an enlarged recess. Greatly angled incident beams can be used by way of this, without a vignetting of the aperture of the mirror plate 1 being produced by the drive frame 3.

Figure 6:
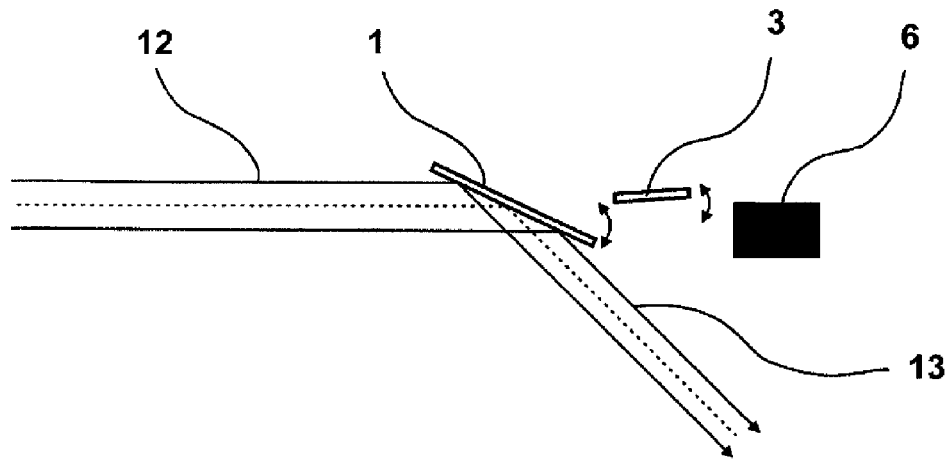
Figure 7:
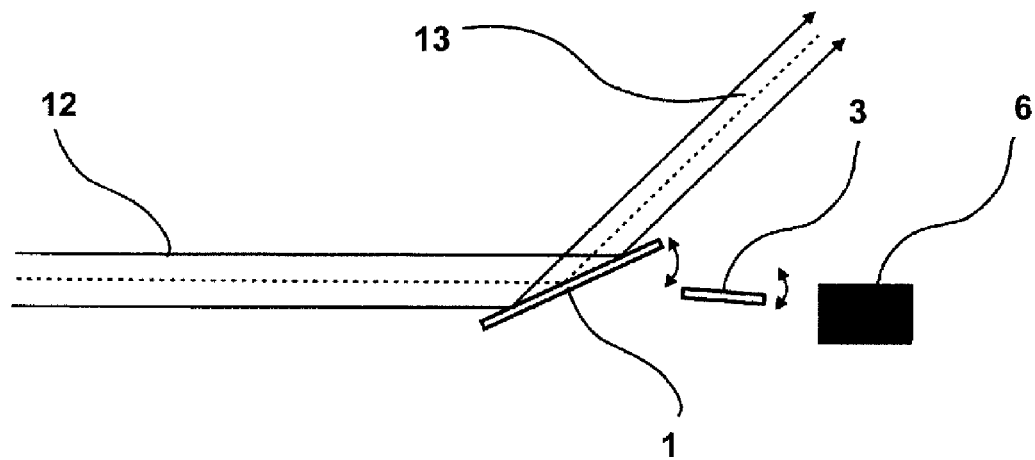

One embodiment is shown in FIGS. 6 and 7, which show a schematic section through the microactuator arrangement, with which the beam path is designed the other way round compared to the previously described beam path, i.e. the incident beam 12 firstly passes the recess 7 and is then deflected by the mirror plate as an exit beam 13.

FIG. 6 shows an arrangement, with which the incident beam 12 falls onto the lower surface of the mirror plate 1, whereas in FIG. 7 the incident beam 12 falls onto the upper side of the mirror plate and is deflected by this. A microactuator arrangement according to the FIGS. 6 and 7 then is particularly advantageous if both sides of the mirror plate are mirrored and are used as a reflector, since then a very much larger spatial angle can be scanned, specifically above the chip which is designed as a microactuator arrangement and below the chip. Thereby, the activation of the comb drive can be realised in a manner such that the incident beam is completely or essentially deflected once form the one side and once from the other side, during one oscillation period.

Figure 8:
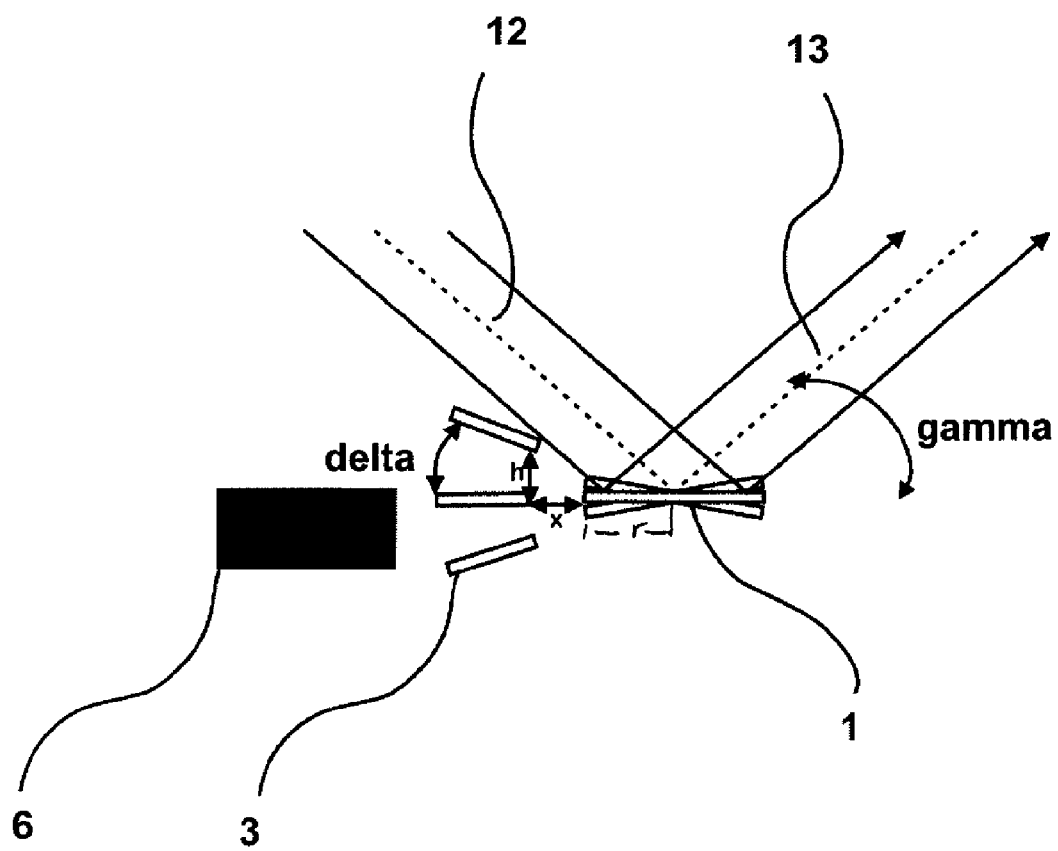

The microactuator arrangement according to FIG. 5 is represented in section in FIG. 8, in order to explain geometric conditions for the lateral distance or intermediate space 9. This distance ensures that the oscillation of the drive frame 3 does not cross the entry beam 12. The lateral distance 9 in the figure is indicated at x and the oscillation amplitude of the drive frame is indicated at h and the radius of the mirror plate at r. The angle gamma is the incident angle as well as the emerging angle, and the angle delta is the maximum deflection angle of the oscillating drive frame 3 with respect to the idle position.

In the case that the entry beam 12, as shown in FIG. 8, firstly passes the chip frame 6 and the drive frame 3, then it results that delta=arctan(h/(r+x))<gamma. It follows that h/(r+x)<tan(gamma) and thus for x it results that x>h(tan (gamma)−r, i.e. the lateral distance must be greater than h/tan(gamma)−r.

In the reverse case, when the entry beam firstly passes the non-closed region 7' in the chip frame 6 and the recess 7 in the drive frame 3, then delta=arctan(h/(r+x))<gamma−2alpha, wherein alpha is the angle of the maximal oscillation amplitude of the mirror plate. Then for the lateral distance it results that x>h/tan(gamma−2alpha)−r.

The invention claimed is:

1. A microactuator arrangement for the deflection of electromagnetic radiation being configured as a double resonator, the microactuator comprising:
a chip frame having a rectangular shape comprising at least two sides parallel to one another, one of the at least two sides having two segments that define an opening;
an outer oscillator configured to set an inner oscillator into oscillation; and
a mirror plate suspended on a drive frame in a movable manner about a first rotation axis via spring elements forming the inner oscillator,
wherein the drive frame is suspended on the chip frame in a movable manner about a second rotation axis via spring elements forming the outer oscillator, the chip frame at least partially surrounding the drive frame,
wherein the drive frame defines a recess adjacent to and aligned with the opening defined by the chip frame, the recess extending from a peripheral edge of the drive frame to the mirror plate,
wherein the recess defined by the drive frame, the opening defined by the chip frame, and the mirror plate are arranged such that the recess and the opening are aligned to allow an unimpeded path for passage of a deflected and incident beam, between the mirror plate and a region outside of the chip frame, that is uninhibited by the drive frame and the chip frame, including during the oscillation.

2. The microactuator arrangement according to claim 1, wherein the first and the second rotation axes are arranged parallel to one another.

3. The microactuator arrangement according to claim 1, comprising an electrostatic, piezoelectric, or electromagnetic drive that drives the non-closed drive frame.

4. The microactuator arrangement according to claim 3, wherein the drive comprises comb electrodes that are arranged on a continuous side of the drive frame that is facing the recess and on a side of the chip frame that lies opposite the continuous side of the drive frame, wherein the electrodes of the drive frame and the electrodes of the chip frame mesh.

5. The microactuator arrangement according to claim 1, wherein the chip frame is U-shaped in a plan view, wherein an open side of the U-shape lies at the side of the recess of the drive frame.

6. The microactuator arrangement according to claim 1, wherein a lateral distance between the mirror plate and drive frame, is arranged to be relatively larger on the side lying opposite the recess.

7. The microactuator arrangement according to claim 6, wherein with a beam incident from a side lying opposite the recess, a lateral distance is selected according to x>h/tan (gamma)−r, wherein x is the lateral distance, r the radius of the mirror plate, h the deflection at the location x+r, and gamma the deflection angle between the mirror surface and the incident beam.

8. The microactuator arrangement according to claim 6, wherein with a beam that is incident from the side of the recess of the drive frame, the lateral distance is selected according to x>h/tan(gamma−2alpha)−r, wherein x is the lateral distance, r the radius of the mirror plate, h the deflection at the location x+r, gamma the deflection angle between the mirror surface in the idle position and the incident beam, and alpha the mechanical oscillation angle amplitude.

9. The microactuator arrangement according to claim 1, comprising a sensor arrangement on the drive frame and on the chip frame to detect position and phase position of the drive frame.

10. The microactuator arrangement according to claim 9, wherein comb-like sensors are arranged laterally next to the recess and the non-closed region, for the detection of the position and phase position of the drive frame.

11. The microactuator arrangement according to claim 9, wherein comb-like sensors are arranged on the limbs of the U-shaped chip frame and on the sides of the drive frame that lies opposite thereto, for the detection of the position and the phase position of the drive frame.

12. The microactuator arrangement according to claim 1, wherein the mirror plate is mirrored on both sides, wherein the incident beam during a duration of an oscillation period of the mirror plate in a temporal sequence is deflectable once from an upper side of the mirror plate and once from a lower side of the mirror plate.

13. A microactuator arrangement for the deflection of electromagnetic radiation being configured as double resonator, the microactuator comprising:
 a chip frame having a rectangular shape, a first side of the chip frame comprising two segments that define an opening;
 a drive frame suspended on the chip frame in a movable manner about a second rotation axis via spring elements forming an outer oscillator configured to set an inner oscillator into oscillation; and
 a mirror plate suspended on the drive frame in a movable manner about a first rotation axis via spring elements forming the inner oscillator, the mirror plate located proximate a recess defined by the drive frame and aligned with the opening defined by the chip frame, the recess extending from a peripheral edge of the drive frame to the mirror plate,
 wherein the drive frame is configured to be driven by an electrostatic drive comprising comb electrodes,
 wherein the chip frame is located about the drive frame on all sides with the exception of the opening proximate the recess, the comb electrodes being arranged on a continuous side of the drive frame that faces the recess and on a side of the chip frame that faces the continuous side of the drive frame; wherein the electrodes of the drive frame and the electrodes of the chip frame engage one another,
 wherein the recess defined by the drive frame, the opening defined by chip frame, and the mirror plate are arranged such that the recess and the opening are aligned to allow an unimpeded path for passage of a deflected or incident beam, between the mirror plate and a region outside of the chip frame, that is uninhibited by the drive frame and the chip frame, including during oscillation.

14. A microactuator arrangement for the deflection of electromagnetic radiation being configured as double resonator, the microactuator comprising:
 a chip frame having a U-shape in plan view that defines an opening;
 a drive frame having an essentially rectangular shape and a recess, the drive frame at least partially surrounded by the chip frame such that the recess is adjacent to and aligned with the opening defined by the chip frame;
 an outer oscillator configured to set an inner oscillator into oscillation; and
 a mirror plate suspended on a drive frame in a movable manner about a first rotation axis via spring elements forming the inner oscillator, the mirror plate located adjacent the recess such that the recess extends from a peripheral edge of the drive frame to the mirror plate;
 wherein the drive frame is suspended on a chip frame in a movable manner about a second rotation axis via spring elements forming the outer oscillator and is driven by an electrostatic drive comprising comb electrodes,
 wherein the comb electrodes being arranged on a continuous side of the drive frame that faces the recess and on a side of the chip frame that faces the continuous side of the drive frame,
 wherein the electrodes of the drive frame and the electrodes of the chip frame engage one another,
 wherein recess defined by the drive frame, the opening defined by the chip frame, and the mirror plate are arranged such that the recess and the opening are aligned to allow an unimpeded path for passage of a deflected and incident beam, between the mirror plate and a region outside of the chip frame, that is uninhibited by the drive frame and the chip frame, including during the oscillation.

* * * * *